US007022258B2

(12) United States Patent
Yang et al.

(10) Patent No.: US 7,022,258 B2
(45) Date of Patent: Apr. 4, 2006

(54) OXYGEN SCAVENGING COMPOSITIONS COMPRISING POLYMERS DERIVED FROM BENZENEDIMETHANOL MONOMERS

(75) Inventors: Hu Yang, San Ramon, CA (US); Ta Yen Ching, Novato, CA (US); Steven Woodcock, Oakland, CA (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 666 days.

(21) Appl. No.: 10/076,064

(22) Filed: Feb. 14, 2002

(65) Prior Publication Data

US 2003/0151025 A1 Aug. 14, 2003

(51) Int. Cl.
*C09K 15/02* (2006.01)
*C09K 15/06* (2006.01)
*C09K 15/08* (2006.01)
*B32B 1/08* (2006.01)

(52) U.S. Cl. ................................ 252/188.28; 428/35.4

(58) Field of Classification Search ........... 252/188.28; 428/35.4

See application file for complete search history.

(56) References Cited

U.S. PATENT DOCUMENTS 3,497,571 A 2/1970 Tellier et al. ............... 260/844
4,415,710 A 11/1983 Barnabeo et al. ........... 525/370
4,524,201 A 6/1985 Barnabeo et al. ........... 528/395
4,735,835 A * 4/1988 Taira et al. ................ 428/35.8
4,868,243 A * 9/1989 Gelles et al. ................. 525/64
5,021,515 A 6/1991 Cochran et al. ............ 525/371
5,116,916 A 5/1992 Young ........................ 525/350
5,153,038 A 10/1992 Koyama et al. ........... 428/35.8
5,211,875 A 5/1993 Speer et al. ........... 252/188.28
5,274,024 A 12/1993 Koyama et al. ............ 524/440
5,281,360 A 1/1994 Hong et al. ............ 252/188.28
5,346,644 A 9/1994 Speer et al. ........... 252/188.28
5,425,896 A 6/1995 Speer et al. ........... 252/188.28
5,466,756 A 11/1995 Roach et al. ............ 525/330.6
5,496,496 A * 3/1996 Kajita et al. ........... 252/182.24

(Continued)

FOREIGN PATENT DOCUMENTS

WO WO 96/25058 8/1996

(Continued)

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond* , OSP Conference, pp. 1-8 (Chicago, Jun. 19-20, 2000).

(Continued)

*Primary Examiner*—Joseph D. Anthony

(57) ABSTRACT

Herein is disclosed an oxygen scavenging composition, comprising (i) an oxygen scavenging polymer comprising structure I:

$$-\!\!(X-R-X-O-CH_2-Ar-CH_2-O)\!\!- \quad (I)$$

wherein —R— is selected from the group consisting of $C_1$–$C_{24}$ alkyl, $C_1$–$C_{24}$ substituted alkyl, $C_6$–$C_{24}$ aryl, and $C_6$–$C_{24}$ substituted aryl; —Ar— is selected from the group consisting of $C_6$–$C_{24}$ aryl and $C_6$–$C_{24}$ substituted aryl; and —X— is selected from the group consisting of null and —C(═O)—; (ii) a transition metal oxidation catalyst; and (iii) an energy-absorbing compound selected from the group consisting of microwave reactive materials and photoinitiators having a wavelength of maximum absorption of electromagnetic radiation from about 200 nm to about 750 nm. The oxygen scavenging composition can be used to form an oxygen barrier packaging article.

18 Claims, 1 Drawing Sheet

U.S. PATENT DOCUMENTS

| | | | | |
|---|---|---|---|---|
| 5,498,364 | A | 3/1996 | Speer et al. | 252/188.28 |
| 5,547,765 | A | 8/1996 | Degrassi et al. | 428/474.7 |
| 5,627,239 | A | 5/1997 | Ching et al. | 525/330.6 |
| 5,641,825 | A | 6/1997 | Bacskai et al. | 524/398 |
| 5,656,692 | A | 8/1997 | Hayes | 525/63 |
| 5,660,761 | A | 8/1997 | Katsumoto et al. | 252/188.28 |
| 5,700,554 | A | 12/1997 | Speer et al. | 428/220 |
| 5,707,750 | A | 1/1998 | Degrassi et al. | 428/475.8 |
| 5,716,715 | A | 2/1998 | Degrassi et al. | 428/475.8 |
| 5,736,616 | A | 4/1998 | Ching et al. | 525/330.3 |
| 5,759,653 | A | 6/1998 | Collette et al. | 428/35.9 |
| 5,763,095 | A | 6/1998 | Ramesh et al. | 428/474.4 |
| 5,776,361 | A | 7/1998 | Katsumoto et al. | 252/188.28 |
| 5,837,158 | A | 11/1998 | Shepodd et al. | 252/181.6 |
| 5,859,145 | A | 1/1999 | Ching et al. | 525/330.6 |
| 5,866,649 | A | 2/1999 | Hong et al. | 524/538 |
| 6,057,013 | A | 5/2000 | Ching et al. | 428/35.7 |
| 6,063,307 | A | 5/2000 | Shepodd et al. | 252/181.6 |
| 6,063,417 | A | 5/2000 | Paleari et al. | 426/127 |

FOREIGN PATENT DOCUMENTS

| | | |
|---|---|---|
| WO | WO98/12127 | 3/1998 |
| WO | WO 99/48963 | 9/1999 |
| WO | WO01/64780 | 9/2001 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond* , OSP Conference Slides (Chicago, Jun. 19-20, 2000).

PCT/US03/04052 International Search Report (Jun. 24, 2003).

* cited by examiner

OXYGEN SCAVENGING COMPOSITIONS COMPRISING POLYMERS DERIVED FROM BENZENEDIMETHANOL MONOMERS

BACKGROUND OF THE INVENTION

1. Field of the Invention

The present invention relates generally to the field of oxygen scavenging compositions. More particularly, it concerns oxygen scavenging compositions comprising polymers derived from benzenedimethanol monomers.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking.

Approaches for minimizing the oxygen exposure of packaged products can generally be grouped into two categories. One set of approaches involves scavenging oxygen present in the package as a result of the packaging process. The other set of approaches involves minimizing the entry of oxygen into the package during or after the packaging process.

Minimizing the entry of oxygen into the package after packaging can be pursued by forming one or more layers of the package from a polymer known to possess oxygen barrier properties. Ethylene/vinyl alcohol copolymer (EVOH) has very good oxygen barrier properties, but its oxygen barrier properties are sensitive to moisture and it is relatively expensive. Polyethylene terephthalate (PET) does not have the latter disadvantages, but its oxygen barrier properties are not as good as those of EVOH. Therefore, there is interest in preparing modified PET or blends of PET with other polymers that may have better oxygen barrier properties than PET alone without suffering from other shortcomings.

One approach that has been attempted is the blending of PET with an oxygen scavenging polymer. The oxygen scavenging polymer would scavenge oxygen that the PET would otherwise permit to pass from the environment to the package contents. An example of this approach is reported by Cochran et al., U.S. Pat. No. 5,021,515 ("Cochran"), which reports a package comprising a layer comprising a blend of 96 wt % PET, 4 wt % poly(m-xylyleneadipamide) (MXD6), and 200 ppm cobalt. The PET provides oxygen barrier properties; the MXD6 provides oxygen scavenging properties; and the cobalt catalyzes oxygen scavenging by the MXD6.

However, the package of Cochran has a number of shortcomings. First, PET and MXD6 are somewhat incompatible, and as a result, the clarity of a transparent bottle comprising this layer will deteriorate over time. Second, the compounding process requires an undesirably high processing temperature because of the incompatibility issue described above as well as the relatively high melting point of MXD6 relative to PET. Third, an extra thermal solidating process is often required to provide adequate oxygen scavenging performance of the PET/MXD6 blend.

Therefore, it is desirable to have a composition comprising PET and oxygen scavenging moieties with superior compatibility and ease of processing. Such a composition would be expected to impart superior physical properties to a package, especially a bottle, made therefrom.

SUMMARY OF THE INVENTION

In one embodiment, the present invention relates to an oxygen scavenging composition, comprising:

an oxygen scavenging polymer comprising structure I:

$$-\!\!\left(X-R-X-O-CH_2-Ar-CH_2-O\right)\!\!- \qquad (I)$$

wherein —R— is selected from the group consisting of $C_1$–$C_{24}$ alkyl, $C_1$–$C_{24}$ substituted alkyl, $C_6$–$C_{24}$ aryl, and $C_6$–$C_{24}$ substituted aryl; —Ar— is selected from the group consisting of $C_6$–$C_{24}$ aryl and $C_6$–$C_{24}$ substituted aryl; and —X— is selected from the group consisting of null and —C(═O)—;

a transition metal oxidation catalyst; and an energy-absorbing compound selected from the group consisting of microwave reactive materials and photoinitiators having a wavelength of maximum absorption of electromagnetic radiation from about 200 nm to about 750 nm.

In still another embodiment, the present invention relates to an oxygen barrier packaging article, comprising an oxygen barrier layer comprising:

an oxygen scavenging polymer comprising structure I, as described above;

a transition metal oxidation catalyst; and an energy-absorbing compound selected from the group consisting of microwave reactive materials and photoinitiators having a wavelength of maximum absorption of electromagnetic radiation from about 200 nm to about 750 nm.

In yet another embodiment, the present invention relates to a method of initiating oxygen scavenging by an oxygen scavenging composition, comprising:

(a) providing an oxygen scavenging composition, comprising:
 (i) an oxygen scavenging polymer comprising structure I, as described above;
 (ii) a transition metal oxidation catalyst; and
 (iii) an energy-absorbing compound selected from the group consisting of microwave reactive materials and photoinitiators having a wavelength of maximum absorption of electromagnetic radiation from about 200 nm to about 750 nm; and (b) exposing the oxygen scavenging composition to electromagnetic radiation for a duration sufficient to initiate oxygen scavenging by the oxygen scavenging composition.

The present invention provides an oxygen scavenging composition which has superior compatibility between its components, and packaging articles comprising oxygen barrier layers comprising the oxygen scavenging composition which have superior oxygen barrier and physical properties.

DESCRIPTION OF ILLUSTRATIVE EMBODIMENTS

Figure 1:
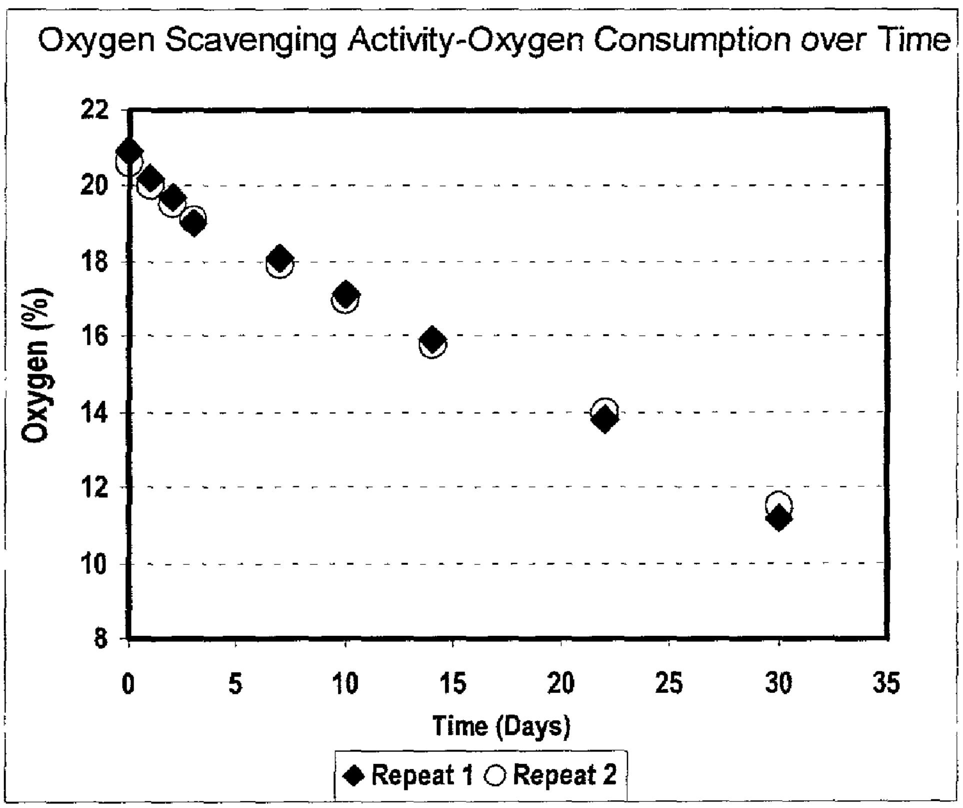
FIG. 1 shows oxygen consumption as a function of time for an oxygen scavenging film comprising poly(benzenedimethanol adipate), as described by Example 2.

In one embodiment, the present invention relates to an oxygen scavenging composition, comprising:

an oxygen scavenging polymer comprising structure I:

$$-\!\!\left(X-R-X-O-CH_2-Ar-CH_2-O\right)\!\!- \qquad (I)$$

wherein —R— is selected from the group consisting of $C_1$–$C_{24}$ alkyl, $C_1$–$C_{24}$ substituted alkyl, $C_6$–$C_{24}$ aryl, and $C_6$–$C_{24}$ substituted aryl; —Ar— is selected from the group consisting Of $C_6$–$C_{24}$ aryl and $C_6$–$C_{24}$ substituted aryl; and —X— is selected from the group consisting of null and —C(═O)—;

a transition metal oxidation catalyst; and an energy-absorbing compound selected from the group consisting of microwave reactive materials and photoinitiators having a wavelength of maximum absorption of electromagnetic radiation from about 200 m to about 750 nm.

It has been observed that a polymer comprising structure I is capable of scavenging oxygen, and thus, in addition to other applications, is useful in oxygen scavenging or active oxygen barrier packaging applications. Though not to be bound by theory, it is believed that a polymer comprising structure I scavenges oxygen by undergoing benzylic oxidation. Though not to be bound by theory, the resulting product is believed to be very stable, and as a result, fragmentation of the polymer does not occur, at least to any significant extent. Further, a polymer comprising structure I is a polyether or polyester, and as a result, will be highly compatible with a polyether or polyester, respectively, added to the composition, either by chemical bonding to the polymer or blending. In addition, the melting point of a polymer comprising structure I will typically be below the melting point of polyethylene terephthalate (PET), and thus, if processed with PET, no change in the process temperature would be expected to be necessary.

As used herein, the term "alkyl" refers to any organic moiety wherein all carbon-carbon bonds are single bonds. Alkyl moieties can be linear, branched, cyclic, or polycyclic moieties. The term "aryl" refers to any organic moiety comprising at least one aromatic ring. Any carbon atoms in an aryl moiety, as defined herein, that are not part of the aromatic ring or rings can be in an alkyl structure bound to an aromatic ring, wherein the alkyl structure meets the definitions of "alkyl" given above.

The term "substituted," as used herein, refers to a moiety comprising carbon, hydrogen, and at least one other element. Preferably, the other element is selected from oxygen, nitrogen, silicon, sulfur, or halogen. Two or more elements other than carbon and hydrogen can be included.

In one preferred embodiment, —X—R—X— is a terephthalic acid moiety. In one preferred embodiment, —X—R—X— is an adipic acid moiety.

The polymer may consist essentially of units having structure I. By "consists essentially" in this context is meant that at least about 95 mol % of units of the polymer have structure I. In one preferred embodiment, at least about 99 mol % of units of the polymer have structure I.

In another embodiment, the polymer further comprises units other than structure I. In one preferred embodiment, the other units are ethylene terephthalate moieties.

The proportion of units having structure I to other units is from 1:99 mol % to 99:1 mol %. Preferably, the proportion of units having structure I to other units is from about 5:95 mol % to about 95:5 mol %. More preferably, the proportion of units having structure I to other units is from about 10:90 mol % to about 90:10 mol %.

The polymer of the oxygen scavenging composition may, by way of example and not to be construed as limiting, be a homopolymer of units having structure I; a copolymer of units having structure I and other units; and a terpolymer of units having structure I and two other units; among others.

Copolymers, terpolymers, and higher order polymers can be random or block polymers.

Preferably, the polymer is a copolymer of units having structure I and ethylene terepthalate units. This polymer may be referred to herein as "benzenedimethanol PET." The term "benzenedimethanol" is meant to include the 1,2-; 1,3-; and 1,4-isomers.

The oxygen scavenging composition further comprises a transition metal. The transition metal functions to catalyze oxygen scavenging by the oxygen scavenging polymer, increasing the rate of scavenging and reducing the induction period. Though not to be bound by theory, useful transition metals include those which can readily interconvert between at least two oxidation states. See Sheldon, R. A.; Kochi, J. K.; "Metal-Catalyzed Oxidations of Organic Compounds" Academic Press, New York 1981.

Preferably, the transition metal is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate, or naphthenate, preferably $C_1$–$C_{20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal may range from 0.001 to 1% (10 to 10,000 ppm) of the oxygen scavenging composition, based on the metal content only (excluding ligands, counterions, etc.).

The oxygen scavenging composition may also comprise an energy-absorbing compound selected from the group consisting of microwave reactive materials and photoinitiators having a wavelength of maximum absorption of electromagnetic radiation from about 200 nm to about 750 nm. Though not to be bound by theory, it is believed that energy-absorbing compounds of the group defined above absorb electromagnetic radiation and at least some of the energy of the electromagnetic radiation activates a chemical process or processes that induces oxygen scavenging by the oxygen scavenging polymer of the composition.

In situations where the energy-absorbing compound is a photoinitiator, the photoinitiator will have a wavelength of maximum absorption of electromagnetic radiation (meaning a wavelength at which the extinction coefficient of the photoinitiator is higher than at any other wavelength) from about 200 nm to about 750 nm. Electromagnetic radiation in this range of wavelengths is readily produced by apparatus that can be conveniently included into package-formation or -filling procedures. Electromagnetic radiation in this range of wavelengths may also provide other useful activities, such as sterilizing a package prior to filling or activating other chemical reactions in the package which may be desired by the user.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-omorpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in the product).

Photoinitiators that are especially useful in the present invention include benzophenone derivatives containing at least two benzophenone moieties, as described in U.S. Pat. No. 6,139,770. These compounds act as effective photoinitiators to initiate oxygen scavenging activity in the oxygen barrier layer of the present invention. Such benzophenone derivatives typically have a very low degree of extraction from the oxygen barrier layer, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_a(B)_b$$

wherein A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as, for example, an ether, ketone, aldehyde, ester, or alcohol.

The substituents of B, herein R", when present, are individually selected from alkyl, aryl, alkoxy, phenoxy, or alicylic groups containing from 1 to 24 carbon atoms, or halides. Each benzophenone moiety can have from 0 to 9 substituents.

Preferably, the combined molecular weight of the A and R" groups is at least about 30 g/mole. Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

As stated above, the amount of photoinitiator can vary. In many instances, the amount will depend on the blend ratio or the particular oxygen scavenging polymer present in the oxygen scavenging composition, the wavelength and intensity of UV radiation used, the nature and amount of any antioxidants present in the oxygen scavenging composition, as well as the type of photoinitiator. The amount of photoinitiator also depends on the intended use of the composition. For instance, if the photoinitiator-containing composition is intended for use in a packaging article as a layer placed underneath a second layer which is somewhat opaque to the radiation used, more initiator may be needed. For most purposes, however, the amount of photoinitiator is in the range of 0.01 to 10% by weight of the oxygen barrier layer.

Alternatively, or in addition, the energy-absorbing compound is a microwave reactive material. Though not to be bound by theory, it is believed that microwave reactive materials absorb electromagnetic radiation in the microwave range, and at least some of the energy of the microwaves activates a chemical process or processes that result in the appearance of free radical electrons in the photoinitiator or fragments of the microwave reactive material produced by the chemical process or processes. Microwaves are readily produced by apparatus that can be conveniently included into package-formation or -filling procedures. Microwaves may also provide other useful activities, such as sterilizing a package prior to filling or activating other chemical reactions in the package which may be desired by the user.

In certain preferred embodiments of the invention, the microwave reactive material is selected from the group consisting of metal materials and materials comprising polar compounds. Preferred polar compounds include water, peroxides, and peroxide solutions. Preferred peroxides include inorganic peroxides selected from the group consisting of sodium percarbonate, potassium percarbonate, calcium percarbonate, and sodium percarbonate, and organic peroxides selected from the group consisting of 2,5-dimethyl-2,5-di (benzoylperoxy) hexane; t-amyl peroxyacetate; t-amyl peroxybenzoate; t-butyl peroxyacetate; t-butyl peroxybenzoate; di-t-butyl diperoxyphthalate; 2,2-di-(t-butylperoxy) butane; 2,2-di(t-amylperoxy) propane; n-butyl 4,4-di(t-butylperoxy)

valerate; ethyl 3,3-di-(t-amylperoxy) butyrate; ethyl 3,3-(t-butylperoxy) butyrate; di-α-cumyl peroxide; α-α'-di-(t-butylperoxy) diisopropylbenzene; 2,5-dimethyl-2,5-di-(t-butylperoxy) hexane; di-t-amyl peroxide; t-butyl α-cumyl peroxide; di-t-butyl peroxide; 2,5-dimethyl-2,5-di-(t-butylperoxy)-3-hexyne; di-t-butyl peroxide; di-t-amyl peroxide; and t-butyl hydroperoxide.

Where the microwave reactive material is a metal material, it can suitably be in a form selected from the group consisting of foils, powders, meshes, staples, buttons, and fibers. In some particularly preferred embodiments, the metal material comprises a powder selected from the group consisting of aluminum, copper, iron, and oxides thereof.

The composition may further comprise other compounds, as will be described in more detail below.

In another embodiment, the present invention relates to an oxygen barrier layer of a packaging article, comprising:

an oxygen scavenging polymer comprising structure I:

$$-(X-R-X-O-CH_2-Ar-CH_2-O)- \quad (I)$$

wherein —R— is selected from the group consisting of $C_1$–$C_{24}$ alkyl, $C_1$–$C_{24}$ substituted alkyl, $C_6$–$C_{24}$ aryl, and $C_6$–$C_{24}$ substituted aryl; —Ar— is selected from the group consisting of $C_6$–$C_{24}$ aryl and $C_6$–$C_{24}$ substituted aryl; and —X— is selected from the group consisting of null and —C(=O)—;

a transition metal oxidation catalyst; and an energy-absorbing compound selected from the group consisting of microwave reactive materials and photoinitiators having a wavelength of maximum absorption of electromagnetic radiation from about 200 nm to about 750 nm.

Packaging articles typically come in several forms including a single layer film, a multilayer film, a single layer rigid article, or a multilayer rigid article. Typical rigid or semirigid articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles either comprise single or multiple layers of material.

The packaging article comprising the oxygen barrier layer can be used to package any product for which it is desirable to inhibit oxygen damage during storage, e.g. food, beverage, pharmaceuticals, medical products, corrodible metals, or electronic devices.

The packaging article comprising the oxygen barrier layer can comprise a single oxygen barrier layer, or an oxygen barrier layer and additional layers, such as an oxygen barrier layer not comprising a polymer comprising structure I, a food-contact layer, a structural layer, or an adhesive layer, alone or in any combination. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques.

As stated above, the packaging article comprises an oxygen barrier layer. In the oxygen barrier layer of the oxygen barrier packaging article, the polymer, the transition metal oxidation catalyst, and the energy-absorbing compound are as described above. The polymer may further comprise other units, as described above.

The polymer may comprise from about 5 wt % to 100 wt % of the oxygen barrier layer. Preferably, the polymer comprises from about 20 wt % to about 80 wt % of the oxygen barrier layer.

Other compounds are commonly used with oxygen scavenging polymers, in order to enhance the functionality of the oxygen scavenging polymers in storage, processing into a layer of a packaging article, or use of the packaging article. Such enhancements include, but are not limited to, limiting the rate of oxygen scavenging by the oxygen scavenging polymer prior to filling of the packaging article with a product, initiating oxygen scavenging by the oxygen scavenging polymer at a desired time, limiting the induction period (the period between initiating oxygen scavenging and scavenging of oxygen at a desired rate), or rendering the layer comprising the oxygen scavenging polymer stronger or more transparent, among others. These compounds can be added to the oxygen barrier layer or another layer of the packaging article, as appropriate for the intended function of the compound.

Additives can be added to further facilitate or control the initiation of oxygen scavenging or oxygen barrier properties. Also, additional components such as a structural polymer or polymers can be added to render the layer more adaptable for use in a packaging article. Particular additives and components to be included in the oxygen barrier layer can be readily chosen by the skilled artisan, depending on the intended use of the oxygen barrier layer and other parameters.

Antioxidants may be used to control scavenging initiation of oxygen scavenging in the oxygen barrier layer. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging in the absence of irradiation. When it is desired to commence oxygen scavenging by the oxygen barrier layer, the packaging article (and incorporated photoinitiator or microwave reactive material) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetrabismethylene 3-(3,5-ditertbutyl-4-hydroxyphenyl)-propionate methane, and dilaurylthiodipropionate are suitable for use with this invention.

The amount of an antioxidant which may be present may also have an effect on oxygen scavenging. As mentioned earlier, such materials are usually present in oxidizable organic compounds or structural polymers to prevent oxidation or gelation of the polymers. Typically, they are present in about 0.01 to 1% by weight of the composition. However, additional amounts of antioxidant may also be added if it is desired to tailor the induction period as described above.

Other additives which can be included in the oxygen barrier layer include, but are not necessarily limited to, fillers, pigments, dyestuffs, stabilizers, processing aids, plasticizers, fire retardants, and anti-fog agents, among others.

Any other additives employed normally will not comprise more than 10% of the oxygen barrier layer by weight, with preferable amounts being less than 5% by weight of the oxygen barrier layer.

The oxygen barrier layer can also comprise film- or rigid-article-forming structural polymers. Such polymers are thermoplastic and render the oxygen barrier layer more adaptable for use in a packaging article. They also may, to some extent, have oxygen scavenging or oxygen barrier properties. Suitable structural polymers include, but are not limited to, polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth)acrylic acid, or ethylene-(meth)acrylic acid ionomers. In rigid articles, such as beverage containers, PET is often used. Blends of different structural polymers may also be used. However, the selection of the structural polymer largely depends on the article to be manufactured and the end use thereof. Such selection factors are well known in the art. For instance, the clarity, cleanliness, effectiveness as an oxygen scavenger, oxygen barrier properties, mechanical properties, or texture of the article can be adversely affected by a structural polymer which is incompatible with the polymer comprising structure I.

Preferably, the structural polymer is PET. PET also exhibits oxygen barrier properties.

In one particular preferred embodiment, the oxygen barrier layer comprises PET and benzenedimethanol PET. The weight ratio between PET and benzenedimethanol PET is preferably from 50:50 to 90:10. Such an oxygen barrier layer allows the incorporation of oxygen scavenging polymers into a predominantly PET composition with high compatibility and with the retention of the structural properties of PET. Further, polymers comprising structure I and ethylene terephthalate units also have oxygen barrier properties. A packaging article comprising such an oxygen barrier layer may be very effective in packaging beer, wine, or other oxygen-sensitive products with the potential for long shelf-lives.

Also, other oxygen barrier polymers can be included in the oxygen barrier layer. Oxygen barrier polymers include poly(ethylene vinyl alcohol) (EVOH), polyacrylonitrile, polyvinyl chloride (PVC), poly(vinylidene dichloride), and polyamides. PET is also an oxygen barrier polymer, as described above.

The oxygen barrier layer may be in the form of a layer, film, liner, coating, sealant, gasket, adhesive insert, non-adhesive insert, or fibrous mat insert in the packaging article.

The packaging article comprising the oxygen barrier layer can comprise a single oxygen barrier layer or an oxygen barrier layer and additional layers. The additional layers of a multilayer material may comprise at least one second oxygen barrier layer, i.e. a layer having an oxygen transmission rate equal to or less than 500 cubic centimeters per square meter ($cc/m^2$) per day per atmosphere at room temperature (about 25° C.), wherein the second oxygen barrier layer does not comprise a polymer comprising structure I. Typical oxygen barrier layers comprise poly(ethylene vinyl alcohol) (EVOH), polyacrylonitrile, polyvinyl chloride (PVC), poly(vinylidene dichloride), polyethylene terephthalate (PET), polyamides, silica, or mixtures thereof. If the oxygen barrier layer comprises EVOH, the packaging article preferably further comprises a moisture barrier layer. Any polymers capable of providing a moisture barrier and being formed into a layer of the packaging article may be used. The moisture barrier layer preferably comprises polyethylene, polyethylene terephthalate (PET), or a mixture thereof. However, because the oxygen barrier layer comprising a polymer comprising structure I may possess adequate oxygen barrier properties, depending on the nature of —R— in structure I, polymers blended with the polymer comprising structure I, and the relative proportion of units having structure I to other units in either a copolymer or a blend, among others, a second oxygen barrier layer may not be necessary.

The additional layers of a multilayer material may comprise at least one structural layer, i.e. a layer imparting strength, rigidity, or other structural properties to the material. The structural layer can comprise polyethylene, low density polyethylene, very low density polyethylene, ultra-low density polyethylene, high density polyethylene, polypropylene, polyethylene terephthalate (PET), polyethylene naphthalate (PEN), nylon, polyvinyl chloride, ethylene-vinyl acetate, ethylene-alkyl (meth)acrylates, ethylene (meth)acrylic acid, ethylene-(meth)acrylic acid ionomer, aluminum foil, or paperboard. PET, aluminum foil, or paperboard are preferred.

The additional layers of a multilayer material may comprise at least one oxygen scavenging layer, i.e. a layer comprising a component that consumes oxygen. The oxygen scavenging layer can comprise squalene, polybutadiene, or ethylenic polymers comprising benzylic, allylic, or ether-containing pendant groups, among other oxygen scavenging materials known to one of ordinary skill in the art. Ethylenic polymers comprising cycloalkenyl pendant groups are preferred.

Other additional layers of the packaging article may include one or more layers which are permeable to oxygen.

Further additional layers, such as adhesive layers, may also be used. Compositions typically used for adhesive layers include anhydride functional polyolefins and other well-known adhesive layers.

The oxygen barrier packaging article can be formed by any appropriate technique. By way of example, and not to be construed as limiting, forming the oxygen barrier packaging article will involve preparing the oxygen scavenging composition and other compounds to be included therein, heating the composition to a temperature above the melting point of the polymer with stirring to produce a homogeneous melt, and subsequent formation of the packaging article or oxygen barrier layer thereof from the melt. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques. Not all of these techniques requiring formation of a melt comprising the polymer. Other techniques for forming an oxygen barrier packaging article of the present invention may be apparent to one of ordinary skill in the art.

In yet another embodiment, the present invention relates to a method of initiating oxygen scavenging by an oxygen scavenging composition, comprising:

(a) providing an oxygen scavenging composition, comprising:

(i) an oxygen scavenging polymer comprising structure I:

$$-\!\!\left(X-R-X-O-CH_2-Ar-CH_2-O\right)\!\!- \qquad (I)$$

wherein —R— is selected from the group consisting of $C_1$–$C_{24}$ alkyl, $C_1$–$C_{24}$ substituted alkyl, $C_6$–$C_{24}$ aryl, and $C_6$–$C_{24}$ substituted aryl; —Ar— is selected from the group consisting of $C_6$–$C_{24}$ aryl and $C_6$–$C_{24}$ substituted aryl; and —X— is selected from the group consisting of null and —C(═O)—;

(ii) a transition metal oxidation catalyst; and (iii) an energy-absorbing compound selected from the group consisting of microwave reactive materials and photoinitiators having a wavelength of maximum absorption of electromagnetic radiation from about 200 nm to about 750 nm; and (b) exposing the oxygen scavenging composition to electromagnetic radiation for a duration sufficient to initiate oxygen scavenging by the oxygen scavenging composition.

The oxygen scavenging composition is as described above. The oxygen scavenging composition can be a solid or a melt, and as a solid it can be in the form of a packaging article or an oxygen barrier layer thereof. Preferably, the exposure is performed when the oxygen scavenging composition has been formed into a packaging article or an oxygen barrier layer thereof. More preferably, the exposure is performed no more than 1 hr prior to filling of the packaging article with a product.

In the performance of the method, the oxygen scavenging composition, in whatever form it is provided, is exposed to electromagnetic radiation. Though not to be bound by theory, it is believed that electromagnetic radiation is absorbed by the energy-absorbing component of the oxygen scavenging composition, and at least some of the energy of the electromagnetic radiation drives chemical reactions that activate oxygen scavenging. Electromagnetic radiation of essentially any peak wavelength (i.e., the wavelength of maximum intensity) can be used.

The optimal duration of the exposure will depend on the peak wavelength of the electromagnetic radiation, the wavelength of maximum absorption of the energy-absorbing compound, the intensity of the electromagnetic radiation, and the geometry of the radiation source and the composition, among other parameters apparent to one of ordinary skill in the art. The duration can be readily adjusted by adjusting one or more of the parameters as the user may desire.

The closer the peak wavelength of the electromagnetic radiation is to the wavelength of maximum absorption of the energy-absorbing compound, the greater the fraction of the electromagnetic radiation's energy that will be absorbed. Thus, either less intense electromagnetic radiation, a shorter duration of exposure, or both are possible, relative to the situation where the peak wavelength of the electromagnetic radiation is further from the wavelength of maximum absorption of the energy-absorbing compound. Preferably, the electromagnetic radiation has a peak wavelength from about 50 nm shorter than the wavelength of maximum absorption of the energy-absorbing compound to about 50 nm longer than the wavelength of maximum absorption of the energy-absorbing compound. More preferably, the electromagnetic radiation has a peak wavelength from about 10 μm shorter than the wavelength of maximum absorption of the energy-absorbing compound to about 10 nm longer than the wavelength of maximum absorption of the energy-absorbing compound.

The electromagnetic radiation can be provided by any appropriate source.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Materials: Cobalt oleate and cobalt neodecanoate were obtained from Shepherd Chemical Co. Tribenzoyl triphenylbenzene ($BBP^3$) photoinitiator was obtained from Chevron Phillips Chemical Co. Poly(ethylene terephthalate) (PET) was obtained from PLM Lidkoping AB. 1,4-Benzenedimethanol was provided by Century Multech Inc. Dimethyl adipate and dimethyl terephthalate were purchased from Aldrich. Titanium isopropoxide was obtained from Elf Atochem Co.

Example 1

Preparation of Oxygen Scavenging Compositions Comprising Benzenedimethanol Containing Polyesters Synthesis of Poly(1,4-benzenedimethylene adipate) (Composition 1): To a pressure-resistant reactor were added 1000 parts of dimethyl adipate, 793 parts of 1,4-benzenedimethanol and 1 part of titanium isopropoxide. The reactor was flushed with nitrogen and heated to 190° C. After 1 hour the temperature was raised to 275° C., the nitrogen flush was stopped and a vacuum line attached. A vacuum pump was activated and the reaction continued for 1 hour at high vacuum. The reaction was then allowed to cool to room temperature under vacuum. The product was dissolved in chloroform and precipitated in an excess of methanol. The polymer was collected by filtration and dried in a vacuum oven overnight. The polyester obtained had a peak melting point of 74° C. as measured by DSC (10° C./min.).

Synthesis of Poly(1,4-benzenedimethylene terephthalate-co-adipate) (Composition 2): To a pressure resistant reactor were added 1000 parts of dimethyl terephthalate, 298.8 parts of dimethyl adipate, 949.2 parts of 1,4-benzenedimethanol, and 3 parts of titanium isopropoxide. The flask was sealed and flushed under nitrogen, then warmed to approximately 150° C. After 1 hour the reaction temperature was increased to 220° C., and held at that temperature for 1 hour. The reaction temperature was then increased to 250° C. Then, 3 parts of triphenyl phosphite were added. After 1–2 hours, the nitrogen flow was stopped, and the flask was connected to a high-vacuum pump. The pressure was lowered to 1 torr, and the reaction was continued for 1–2 hour. The temperature was finally raised to 270–280° C. Afterwards the vacuum line was disconnected and the polymer was poured onto an aluminum pan to cool, under nitrogen blanket. The product was a low molecular weight polymer with an inherent viscosity of 0.2. The polymer was then ground into smaller particle sizes and heated at 240° C. under high vacuum for 2 hours. This resulted in a high molecular weight polymer with an inherent viscosity of 0.6. The polymer had a melting range of 208–230° C. as measured by DSC (10° C./min.).

Formulation of Oxygen Scavenging Composition by Solution Method (Composition 1): 100 Parts of poly(1,4-benzenedimethylene adipate) prepared by the above procedure was dissolved in chloroform to make up a 20% solution. To the solution was added 0.1 part of cobalt II catalyst (as oleate salt) and 0.1 part of photoinitiator ($BBP^3$). After a clear blue-colored solution was obtained, the solution was poured onto a flat surface and the solvent was allowed to evaporate at room temperature. The obtained polymer film was further dried in a vacuum over night, which gave an optically clear film and was used for the subsequent demonstration for oxygen scavenging activity.

Formulation of Oxygen Scavenging Composition by Melt Process (Composition 2): Poly(1,4-benzenedimethylene terephthalate-co-adipate) prepared by the above procedure was processed on a Haaka twin screw extruder at 260° C. and the polymer strand was then pelletized. To evaluate the compatibility of the prepared polyester with commercial PET, 30 parts of poly(1,4-benzenedimethylene terephthalate-co-adipate) pellets and 70 parts of commercial PET pellets were mixed in a container. To the mixture, 0.01 part of cobalt II catalyst (as noedecanoate slat) and 0.01 part of photo initiator (BBP3) were added and thoroughly mixed. It was found to be usually more efficient to add the catalyst and photo initiator as a solution with minimal amount of methylene chloride. The mixture was compounded on a Haaka twin screw extruder at 260° C. and a screw speed of 40 rpm. This gave an optically clear strand, an indication of desired compatibility between the prepared polyester and the commercial PET.

Example 2

Oxygen Scavenging Activity of Benzenedimethanol-Containing Polyester

The oxygen scavenging activity was demonstrated by monitoring the reduction in oxygen concentration as a result of consumption of oxygen by the prepared film sample. Thus, 0.5 gram of film sample made from poly(benzenedimethanol adipate) was first activated by exposure to a UV light at 254 nm for 85 sec, which resulted in a dosage of 100 $mJ/cm^2$. The irradiated film sample was then sealed in an aluminum bag and filled with 300 cc of air and kept at room temperature over time. The reduction in oxygen concentration over time was analyzed on a Mocon 450 Headspace Analyzer by taking 5 cc of gas from the bag at different time intervals. Results of a duplicated test are shown in FIG. 1. The figure indicates that the oxygen was consumed rapidly, and more than 50 cc oxygen was scavenged for each gram film sample.

Not to be bound by the theory, it is believed that the methylene adjacent to the benzene ring on the benzenedimethylene unit was responsible for reacting and consuming oxygen, catalyzed by the cobalt salt. It is believed that the stabilization effect of the benzene ring made proton abstraction at the methylene adjacent to the benzene ring more feasible, which is the rate-limiting step in the oxidation reaction. The active scavenging capability of the invented compositions will make it feasible to enhance the oxygen barrier performance by incorporating such compositions into the packaging structure since they are capable of scavenging and intercepting the oxygen transmission from the environment into the packaging structure. Additional benefit can be achieved from the invented compositions because they are compatible with commercial PET, a dominant packaging material for the rigid packaging application where the clarity is an important property to be maintained. Furthermore, the functional monomer, benzenedimethanol, can be used as feed stock in the current PET manufacturing process with minimum impact on the process, it will be highly economical to produce the functional PET product, and turn it into active oxygen barrier material by incorporating the appropriate amount of cobalt catalyst and photo initiator during the down stream processing.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen barrier packaging article, comprising:

an oxygen scavenging polymer comprising structure I:

$$-\!\!(X-R-X-O-CH_2-Ar-CH_2-O)\!\!- \qquad \text{(I)}$$

wherein —R— is selected from the group consisting of $C_1$–$C_{24}$ alkyl, $C_1$–$C_{24}$ substituted alkyl, $C_6$–$C_{24}$ aryl, and $C_6$–$C_{24}$ substituted aryl; —Ar— is selected from the group consisting of $C_6$–$C_{24}$ aryl and $C_6$–$C_{24}$ substituted aryl; and —X— is selected from the group consisting of null and —C(═O)—;

a transition metal oxidation catalyst; and an energy-absorbing compound selected from the group consisting of microwave reactive materials and photoinitiators having a wavelength of maximum absorption of electromagnetic radiation from about 200 nm to about 750 nm.

2. The packaging article of claim 1, wherein the oxygen scavenging polymer consists essentially of units having structure I.

3. The packaging article of claim 1, wherein the transition metal catalyst is a cobalt salt.

4. The packaging article of claim 3, wherein the cobalt salt is selected from the group consisting of cobalt oleate, cobalt stearate, and cobalt neodecanoate.

5. The packaging article of claim 1, wherein the energy-absorbing compound is a photoinitiator selected from the group consisting of benzophenone derivatives containing at least two benzophenone moieties and having the formula:

$$A_a(B)_b$$

wherein

A is a bridging group selected from the group consisting of sulfur, oxygen, carbonyl, —SiR"$_1$—, wherein each R" is individually selected from alkyl groups containing from 1 to 12 carbon atoms, aryl groups containing 6 to 12 carbon atoms, or alkoxy groups containing from 1 to 12 carbon atoms, —NR'"—, wherein R'" is an alkyl group containing 1 to 12 carbon atoms, an aryl group containing 6 to 12 carbon atoms, or hydrogen, and an organic group containing from 1 to 50 carbon atoms;

a is an integer from 0 to 11;

B is a substituted or unsubstituted benzophenone group; and b is an integer from 2 to 12.

6. The packaging article of claim 5, wherein the photoinitiator is selected from the group consisting of dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

7. The packaging article of claim 1, further comprising an antioxidant.

8. The packaging article of claim 7, wherein the antioxidant is selected from the group consisting of 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate.

9. The packaging article of claim 1, further comprising an oxygen barrier polymer selected from the group consisting of poly(ethylene vinyl alcohol) (EVOH, polyacrylonitrile, polyvinyl chloride (PVC), poly(vinylidene dichloride), polyethylene terephthalate (PET), and polyamide.

10. The packaging article of claim 1, further comprising an oxygen barrier layer.

11. The packaging article of claim 10, wherein the oxygen barrier layer comprises poly(ethylene vinyl alcohol) (EVOH), polyacrylonitrile, polyvinyl chloride (PVC), poly (vinylidene dichloride), polyethylene terephthalate (PET), or polyamide.

12. The packaging article of claim 11, wherein the oxygen barrier layer comprises EVOH, and the packaging article further comprises a moisture barrier layer.

13. The packaging article of claim 12, wherein the moisture barrier layer comprises polyethylene, polyethylene terephthalate (PET), or a mixture thereof.

14. The packaging article of claim 1, further comprising a structural layer.

15. The packaging article of claim 14, wherein the structural layer comprises polyethylene, low density polyethylene, very low density polyethylene, ultra-low density polyethylene, high density polyethylene, polypropylene, polyethylene terephthalate (PET), polyethylene naphthalate (PEN), nylon, polyvinyl chloride, ethylene-vinyl acetate, ethylene-alkyl (meth)acrylates, ethylene-(meth)acrylic acid, ethylene-(meth)acrylic acid ionomers, aluminum foil, or paperboard.

16. The packaging article of claim 15, wherein the structural layer comprises PET, aluminum foil, or paperboard.

17. The packaging article of claim 1, wherein the oxygen scavenging polymer, the transition metal oxidation catalyst and energy-absorbing compound comprise a liner, coating, sealant, gasket, adhesive insert, non-adhesive insert, or fibrous mat insert in the packaging article.

18. The packaging article of claim 1, wherein the packaging article is in the form of a single layer film, a multilayer film, a single layer rigid article, or a multilayer rigid article.

* * * * *